Figure 3:
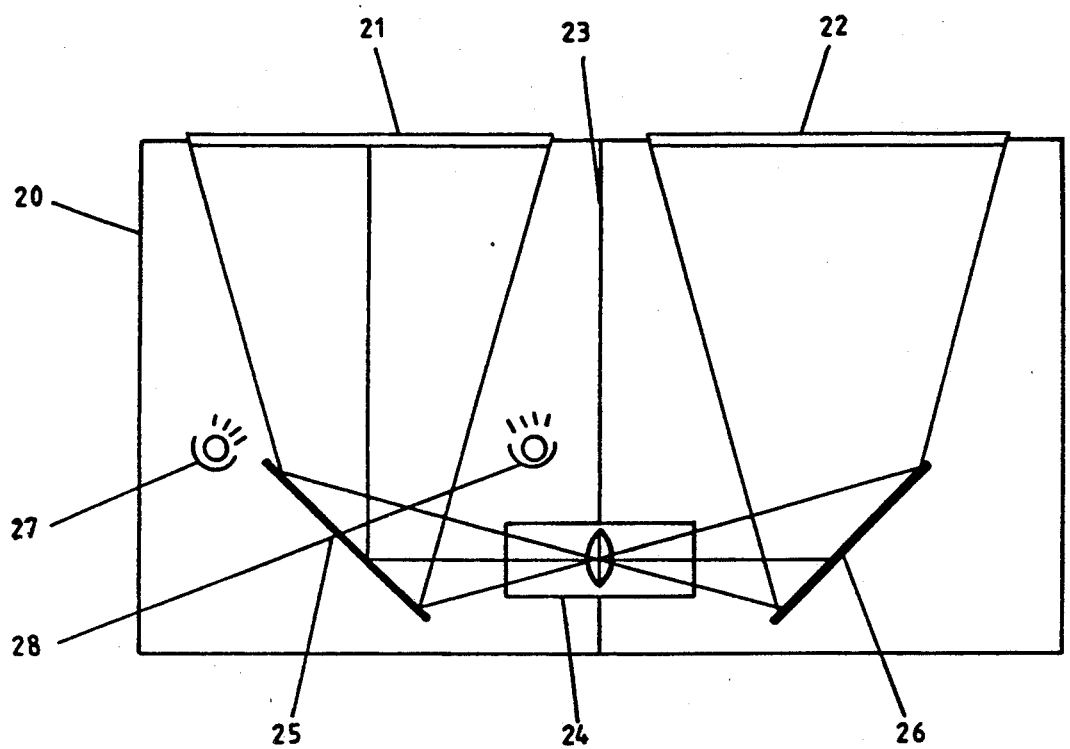

United States Patent [19]

Balstrup

[11] Patent Number: 5,053,810
[45] Date of Patent: Oct. 1, 1991

[54] REPROGRAPHIC LENS SYSTEM AND A REPROGRAPHIC CAMERA COMPRISING SUCH A SYSTEM

[75] Inventor: Bo Balstrup, Fredensborg, Denmark

[73] Assignee: Helioprint A/S, Denmark

[21] Appl. No.: 555,425

[22] PCT Filed: Feb. 14, 1989

[86] PCT No.: PCT/DK89/00028
§ 371 Date: Sep. 27, 1990
§ 102(e) Date: Sep. 27, 1990

[87] PCT Pub. No.: WO89/07784
PCT Pub. Date: Aug. 24, 1989

[30] Foreign Application Priority Data

Feb. 15, 1988 [DK] Denmark ............................ 756/88

[51] Int. Cl.⁵ .................... G03B 27/34; G03B 27/40; G03B 27/70
[52] U.S. Cl. ........................................ 355/57; 355/60
[58] Field of Search ....................... 355/55–58, 355/60, 50, 52, 55, 32; 350/184, 419, 429

[56] References Cited

U.S. PATENT DOCUMENTS

| | | | |
|---|---|---|---|
| 2,391,430 | 12/1945 | Macek | |
| 3,045,539 | 7/1962 | Dupre | |
| 3,428,398 | 2/1969 | Gottschalk | 355/52 |
| 3,584,950 | 6/1971 | Gundlach | 355/50 |
| 3,687,522 | 8/1972 | Lynch et al. | 350/184 |
| 3,728,010 | 4/1973 | Mikami | 350/184 |
| 3,883,228 | 5/1975 | Betensky | 350/184 |
| 4,336,996 | 6/1982 | Cattelani et al. | 355/39 |
| 4,474,462 | 10/1984 | Ogawa et al. | 355/60 |
| 4,557,593 | 12/1985 | Iwanade | 355/57 |
| 4,586,814 | 5/1986 | Tokuhara et al. | 355/55 |
| 4,618,253 | 10/1986 | Arai | 355/57 |
| 4,627,720 | 12/1986 | Yonemori et al. | 355/57 |
| 4,676,632 | 6/1987 | Arai | 355/56 |
| 4,732,458 | 3/1988 | Zambelli | 350/419 |
| 4,758,072 | 7/1988 | Harrigan | 350/419 |
| 4,812,021 | 3/1989 | Harrigan | 350/429 |
| 4,825,252 | 4/1989 | Suzuki et al. | 355/32 |

*Primary Examiner*—Richard A. Wintercorn
*Attorney, Agent, or Firm*—Sughrue, Mion, Zinn, Macpeak & Seas

[57] ABSTRACT

A photographic lens system having three subsystems aligned about the optical center. The first system is a zoom lens. The second is a field lens or illumination source. The third subsystem is a second zoom lens. The second subsystem is arranged to reproduce the outlet aperture of the first zoom lens in the inlet aperture of the second zoom lens.

6 Claims, 3 Drawing Sheets

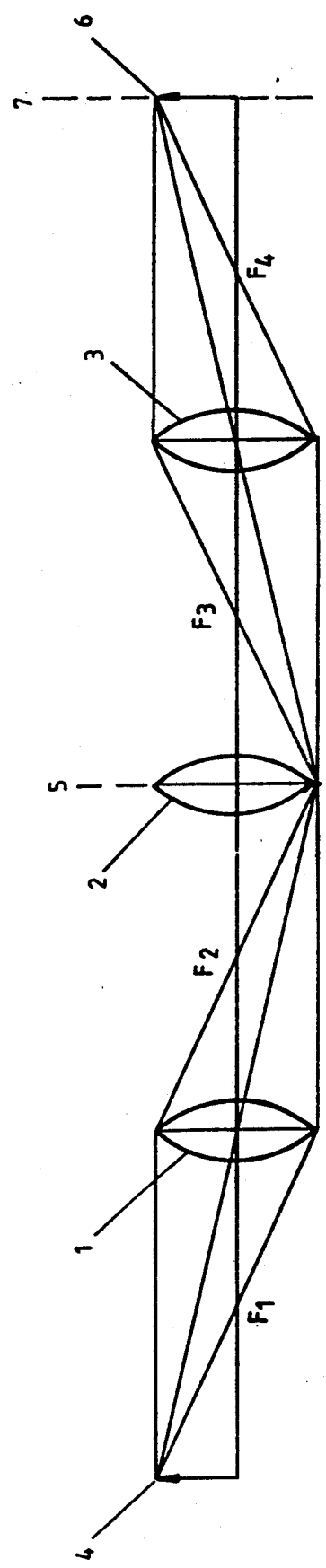

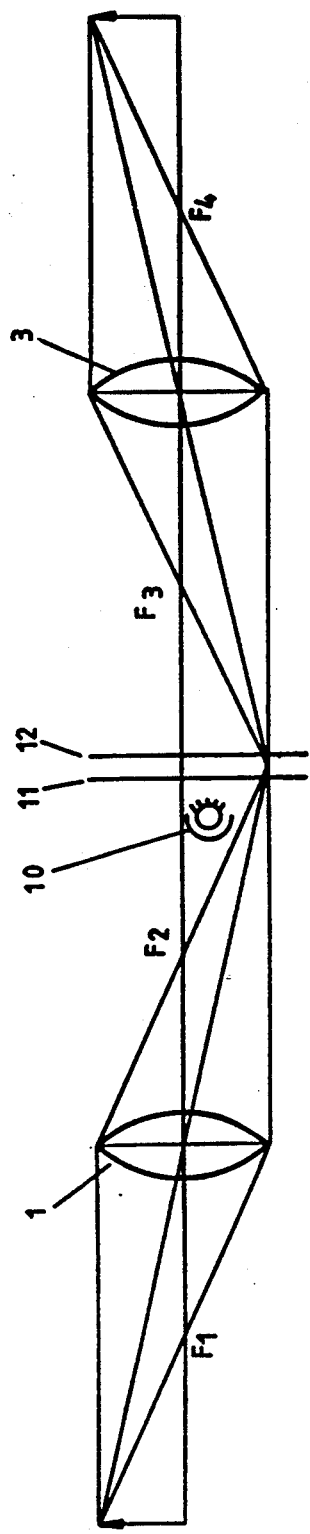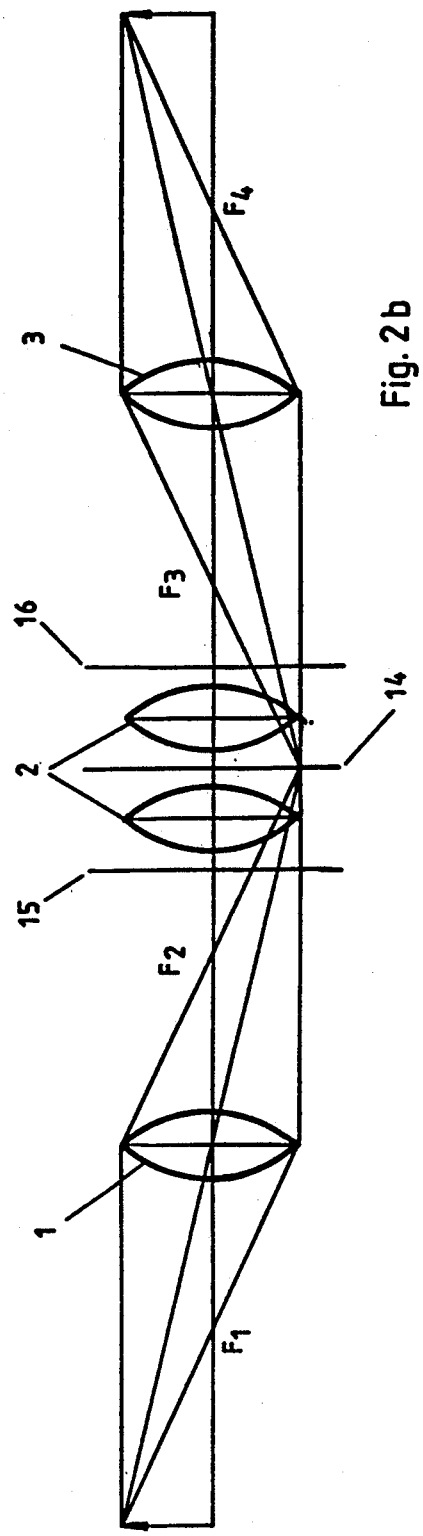

REPROGRAPHIC LENS SYSTEM AND A REPROGRAPHIC CAMERA COMPRISING SUCH A SYSTEM

The invention relates to a reprographic lens system consisting of first, second and third subsystems aligned about the optical centre of the system. The first subsystem comprises a first zoom lens, the second subsystem a field lens and the third subsystem comprises a second zoom lens.

In known reprographic cameras it is necessary to use vertically movable mechanical adjustments. This is due to the fact that with objectives with fixed focal lengths it is necessary to adjust the distance between object and image to achieve the desired reproduction ratio. This implies that it is often the guiding mechanism of the camera setting in practice the limits to the reproduction ratio and thus to the usable range. Accordingly, it has so far been necessary to use lens systems with exchangeable/readjustable optics.

The object of the present invention is to provide a lens system which can be constructed from components known per se and in which the lens system has variable focal length for providing reproduction ratios within a large reproduction interval. Furthermore, the object is to provide a reproduction apparatus for carrying out the invention in such a way that the reprographic camera includes as few movable components as possible.

This is obtained according to the invention in that the field lens is arranged to reproduce the outlet aperture of the first zoom lens in the inlet aperture of the second zoom lens. In such a construction of the lens system a far higher flexibility is achieved than obtained until now as it is hereby possible to reproduce within a large magnification interval with the same optics and without the need for translatory movement of guiding elments for changing the distance between the object plane and the image plane.

In practice, the fewer movable parts mean that a generally simplified constrcution and control of the camera is achieved and, moreover, a greater accuracy in eliminating the error possibilities from the curvilinearity and linearity irregularities from the guiding elements of the conventional reprographic camera.

The lens system is likewise advantageous for application in connection with the types of reprographic cameras in which the object plane and the image plane are in the same plane. Such an apparatus is typically provided with reflective means, like mirrors or prisme bending the path of beams and which are, moreover, translatorily movable for variation of the magnification. It is evident that the application of the lens system according to the invention in this type of apparatus makes the use of horizontally movable mirrors obsolete as the lens system performs the changes in focal lengths.

The invention will now be explained in more detail with reference to the drawings, in which FIG. 1 schematically illustrates an embodiment of a lens system according to the invention, FIG. 2a and 2b illustrate the lens system provided with further elements, and FIG. 3 illustrates an embodiment of a reprographic camera according to the invention.

FIG. 1 is a schematical view of a lens system according to the invention. The lens system consists of three main elements 1, 2 and 3. The elements may consist of a number of sections which for the sake of clearness are not shown.

Element 1 produces a real image of the object 4 in a plane 5 coinciding with the plane of symmetry of lens element 2, and element 3 produces a real image 6 of the object 4 in a plane 7.

Lens element 2, the field lens, is formed so that it reproduces the outlet aperture of lens element 1 in the inlet aperture of lens element 3. This provides for obtaining a maximum transfer of light energy from lens element 1 to lens element 3.

According to the present invention lens elements 1 and 3 are formed as elements with variable focal lenth, so-called zoom lenses. In a preferred embodiment these are desgined so that their outlet apertures are in a fixed plane, irrespective of the instantaneous adjustment of the focal length. However, this is no limitation in practice.

In the practical structure of the lens system according to the invention lens system 1 and 3 are preferably identical. This entails, moreoover, that the resolution can be maintained for the copy with the reproduction ratio 1:1.

FIG. 2a illustrates how a light source 10, a filter 11 and a transparent original 12 may be inserted instead of lens system 2. It is thus possible to reproduce the transparent original under reproductional circumstances determined by lens system 3. This gives a simple solution to the problems involved in respect of the reproduction of diapositives and similar transparent originals.

As illustrated in FIG. 2b, lens element 2 may also include a diaphragm 14, filters 15, shutters 16 or other members that are desired to be inserted into the path of beams.

FIG. 3 shows diagrammatically a reprographic camera according to the present invention, the lens system of which is constructed as explained above. The camera includes an apparatus housing 20 carrying an object plane 21 and an image plane 22. Object plane 21 and image plane 22 are separated by a wall 23 impermeable to light and accommodating lens system 24. Mirrors 25, 26 are arranged to bend the path of beams and are stationary in relation to object plane 21, image plane 22 and lens system 24. The light sources 27, 28 illuminate the object plane with a pre-determined light distribution. This design of the camera provides for obtaining considerable operational advantages, the object plane and the image plane being at the same horizontal plane and located at a comfortable working height contrary to the prior art reprographic cameras, that are difficult to operate, particularly on the image plane. This camera may incidentally be equipped with known automatics for illumination, focusing and so on.

The described lens system may of course be used in a conventional reprographnic camera as well, the problems of restriction of the guiding elements being eliminated and the magnification ratios being fully defined by the possibilities of the chosen lens system. This provides, moreover, for reducing the problems of irregularities of curvilinearity and linearity.

I claim:

1. A reprographic lens system comprising; first, second and third subsystems aligned about the optical center of the system, the first subsystem (1) comprising a first zoom lens, the second subsystem (2) a field lens and the third subsystem (3) comprising a second zoom lens, wherein the field lens (2) is arranged to reproduce the outlet aperture of the first zoom lens in the inlet aperture of the second zoom lens.

2. A lens system as claimed in claim 1, wherein the second subsystem (2) includes a diaphragm (14), shutters (16), filters (15) and an additional optical element inserted into the path of beams.

3. A reprographic lens system as claimed in claim 2, wherein second system comprises a field lens (2).

4. A repreographic lens system as claimed in claim 1 further comprising a camera of the type in which the object plane and the image plane are on the same level and the path of beams is bent by two reflecting surfaces, wherein said reflecting surfaces are stationary.

5. A system as claimed in claim 4, wherein the second subsystem comprises a light source and a holder for an original.

6. A reprographic lens system as claimed in claim 1 wherein said second subsystem comprises an illuminating unit (10) for originals.

* * * * *